Patented Aug. 11, 1953

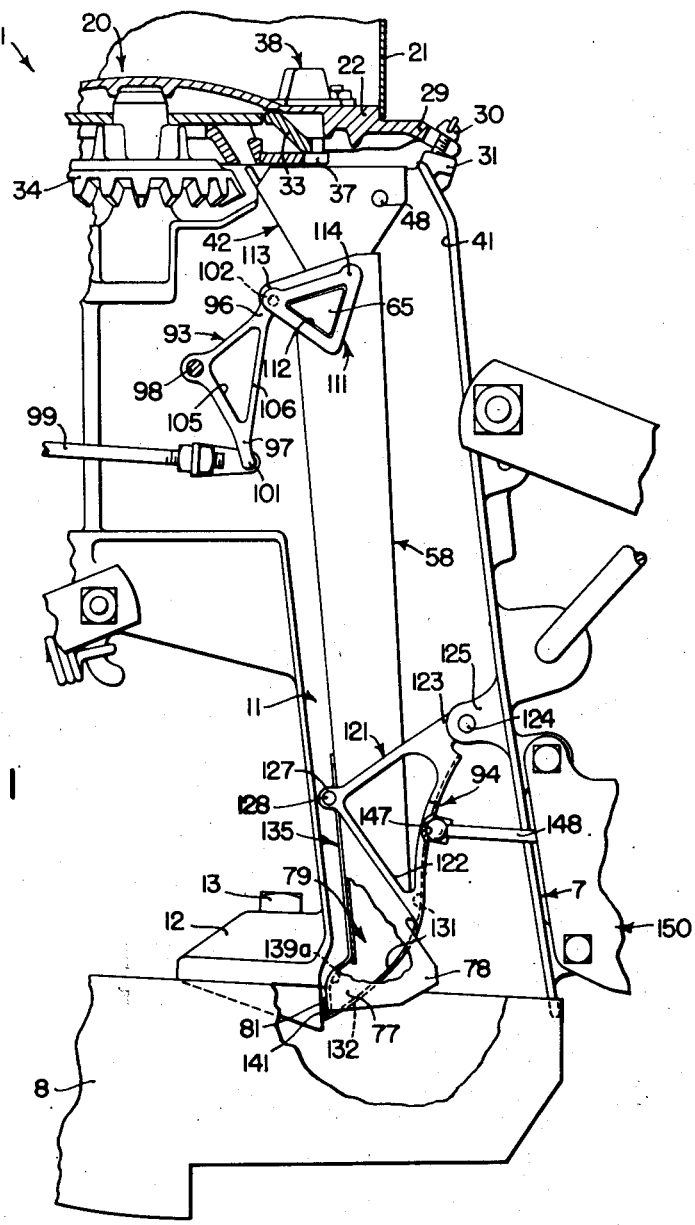

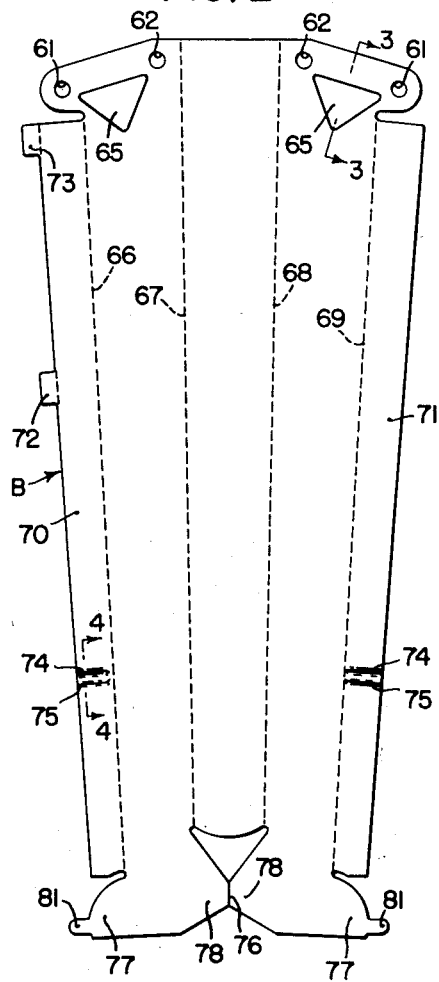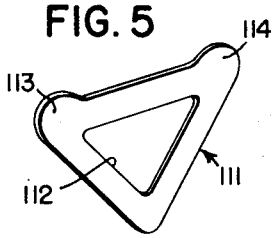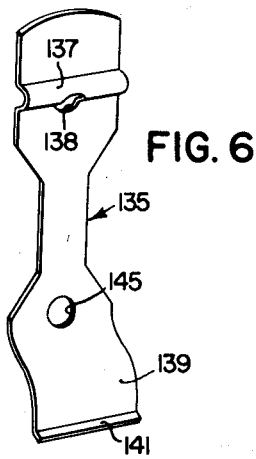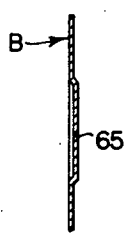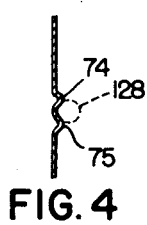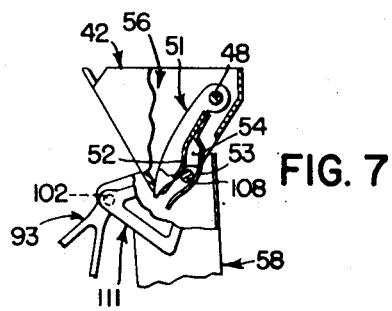

2,648,301

UNITED STATES PATENT OFFICE 2,648,301

PLANTER

Charles H. White and William P. Oehler, Moline, Ill., assignors to Deere & Company, Moline, Ill., a corporation of Illinois Application December 19, 1947, Serial No. 792,642

7 Claims. (Cl. 111—51)

1

The present invention relates generally to planters and the like and is more particularly concerned with planters having seed valves, such as are used in check-row or hill drop planters or the like.

The object and general nature of the present invention is to provide a planter having seed valves which are especially constructed and arranged to be operated at comparatively high speeds, such as five or six miles per hour, or more, and thereby particularly adapted for operation with farm tractors and other powered equipment.

One of the principal features of the present invention is the provision of a planter having upper and lower valves and an enclosed seed passage leading from one valve to the other, in which the rapidly oscillating parts are made as light as possible, consistent with the requisite strength, in order to reduce the inertia of the parts as much as possible. Further, it is a feature of this invention to provide a seed tube and valve structure in which the fabrication of the parts may be effected easily and quickly without requiring an excessive number of jigs and fixtures for such purpose.

These and other objects and advantages of the present invention will become apparent to those skilled in the art after a consideration of the following detailed description, taken in conjunction with the accompanying drawings, in which:

Figure 1 is a fragmentary side view, with certain parts broken away, of a planter furrow opener and cooperating seed tube and valve parts in which the principles of the present invention have been incorporated.

Figure 2 is a view of the valve blank from which the seed tube is formed.

Figure 3 is an enlarged sectional view taken generally along the line 3—3 of Figure 2.

Figure 4 is an enlarged detail view showing the locating shoulders formed on the seed tube.

Figure 5 is a perspective view of one of the upper valve tie plates.

Figure 6 is a perspective view of a combined pivot bracket and lower valve member.

Figure 7 is a detail of the upper valve.

Referring now to the drawings, and more particularly to Figure 1, the reference numeral 1 indicates the planting unit of an agricultural implement, such as a corn planter. Inasmuch as this type of planter is old and well known in the art, it is not thought necessary to completely illustrate the same herein. Hence, only such parts of the planter as are necessary to an understanding of the present invention have been shown. Tractor operated planters are usually provided with a plurality of planting units, such as the one indicated by the reference numeral 1, and usually such a planter comprises frame means, which may be the tractor itself, to which each planting unit is connected by any suitable form of draft means. Preferably, each planting unit includes a furrow opener shank 7 to the lower end of which a furrow opener 8 is connected. The shank 7 is preferably a casting which is hollow, as indicated at 11, so as to provide what may be termed a seed passage in which the seed valves and associated mechanism are disposed. The furrow opener shank 7 is provided with a forwardly extending lug 12 by which the furrow opener 8 may be fixed thereto in any suitable manner, as by a bolt 13. The furrow opener 8 preferably is made up of two spaced apart sections.

The upper end of each furrow opener shank 7 conventionally carries seed selecting and feeding mechanism, indicated in its entirety by the reference numeral 20. Preferably, the seed selecting and feeding mechanism includes a seed can 21 secured in any suitable manner to a base or support 22 that is pivoted by any suitable means to the upper and forward portion of the shank 7. The base 22 is also provided with a pair of rear lugs 29 with which a thumb screw 30, pivoted to a lug 31 on the upper end of the shank 7, is adapted to engage for fixing the seed can 21 in operative position. The flow of seed from the seed can or hopper 21 is controlled by a seed plate 33 rotatably mounted at the bottom of the hopper 21 and driven by means of a bevel gear 34 which meshes with a pinion driven in any suitable manner from the tractor or the ground wheels (not shown), or in any other suitable manner. The hopper bottom 22 is formed so that the seed in the seed cells of the seed plate can drop from the plate only at a certain point, as indicated by the opening 37. Usually, the seed drops by gravity from the seed plate whenever the cells are rotated into a position over the opening 37. However, in the event that the seed should tend to stick in the cells, the usual cut-off and knocker mechanism, indicated in its entirety by the reference numeral 38, ejects the seed. Since the details per se of the mechanism 38 do not form a part of the present invention, except in novel combination with other parts to be described later, it is not deemed necessary to show the knocker and cut-off mechanism 38 in detail. So far as the present invention is concerned, any suitable means for removing, discharging or ejecting the seed from the seed plate at a certain point in the rotation of the seed plate may be used. Therefore, the seed selecting and feeding mechanism just described is representative of any suitable selecting mechanism for dropping a predetermined number of seeds according to the actuation of the seed plate 33 or some other part.

The upper end of the runner shank 7 is formed with a seed chamber 41 in which a seed chute 42 is disposed. The seed chute 42 is bolted or otherwise securely fixed to the shank 7, and the rear end of the chute 42 is open but is adapted to be closed by an upper valve 51. The valve 51 preferably is formed of sheet metal in order to secure lightness and is pivotally mounted on a stud 48 that is fixed to one side wall of the shank 7 and extends between the two side walls of the seed chute 42. The valve 51 is provided with a forward face 52 and has a clip 53 welded thereto, the part 53 being shaped so as to cooperate with the rear face of the valve member 51 to form a slot 54. The seed chute 42 and the valve 51 form a seed receiving chamber 56 adapted to receive seed from the seed selecting and feeding mechanism 20, described above, and the movement of the seed from the seed receiving chamber 56 just mentioned is controlled by the opening and closing of the valve 51.

The seed discharged from the seed receiving chamber 56 and valve 51 are received in the upper end of a closed seed tube, indicated in its entirety by the reference numeral 58, and with the upper end of which the lower end of the seed chute 42 is in telescopic association. Also, the seed tube 58 serves as means for operating the upper valve 51. The seed tube 58 is square or rectangular in cross section and is formed from a blank B, best shown in Figure 2.

Referring now to this figure, the blank B is formed at its upper end with pairs of openings 61, 62 and has pressed into the upper portions a pair of generally triangular shaped locating bosses 65. In making the seed tube, the blank B is folded along the lines 66, 67, 68, and 69 so that the opposite edge portions 70 and 71 of the blank meet in substantially abutting relation. Formed on the edge portion 70 is a pair of lugs 72 and 73 which are offset substantially the thickness of the stock, and the lugs are fixed, as by spot welding, to the adjacent portions of the opposite edge section 71 when the seed tube is formed. At the lower portion of the blank the opposite edge portions 70 and 71 are formed with pairs of locating shoulders 74 and 75, which form pivot pin-receiving socket means and will be referred to in more detail later, and at the lower edge of the blank the latter is cut along the line 76 to form oppositely disposed extensions 77 and 78 which, when the seed tube is completed, form the side walls of a lower seed chamber 79. The extensions 77 carry lugs or tabs 81 which are adapted to be fixed, as by spot welding, to the lower portion of a combined pivot bracket and seed ejecting toe section or valve member, also referred to in detail below.

The seed tube 58 is supported for vertical oscillatory movement upon pivotally mounted upper and lower members 93 and 94. The upper member 93 is in the form of a bell crank lever having a pair of interconnected sections, each including arm sections 96 and 97. The bell crank member 93 is pivotally mounted on a stud 98 carried by the shank 7 and is rocked about the stud 98 by means of an operating link 99 which is actuated by any suitable valve operating means. The rear end of the link 99 is apertured to receive a stud 101 that is welded to and serves to rigidly interconnect the two bell crank arms 97 and the upper bell crank arms 96 are apertured to receive a pivot pin 102 that is received in the seed tube upper openings 61 and fixed to the upper end of the seed tube 58. Preferably, each of the bell crank sections has a central cut-out portion 105 and a reenforcing portion 106.

When the bell crank member 93 is rocked about its supporting pivot 98, the seed tube 58 is moved generally vertically, and this movement is utilized for opening and closing the valve member 51 through a pin 108 which extends through the slot 54 and the openings 62 in the upper end of the seed tube. The pivot pins 102 and 108 are fixed to the upper end of the seed tube 58 by means of a pair of valve tie plates 111 which, as best shown in Figure 5, are generally triangular in configuration and are formed with a central cut-out section 112 that is adapted to receive the locating boss portions 65 of the seed tube. Each tie plate is also provided with rounded extensions 113 and 114 against which the ends of the pivot pins 102 and 108 are adapted to bear. Preferably, the pair of tie plates 111, located by the boss portions 65, are spot welded to the sides of the seed tube and also to the ends of the pivot pins 102 and 108. In this way, without the use of jigs, fixtures or the like, the pivot pins 102 and 108 may be fixed, as by welding, to the upper end of the seed tube since the bosses 65 properly locate the tie plate 111 during the welding of the latter to the seed tube and to the ends of the pivot pins 102 and 108. The tie plates 111 also strengthen and reenforce the upper end of the seed tube 58. The cam slot 54 in the upper valve member 51 is shaped so that when the tube 58 is moved downwardly, the valve 51 moves rearwardly away from the adjacent face of the seed chute 42.

The lower bell crank member 94 comprises a pair of triangular sections 121 having cut-out portions 122 for lightness and apertured ears 123 receiving a pivot pin 124 by which the member 94 is pivotally mounted on a lug 125 carried by the shank 7. The triangular portions 121 of the member 94 also carry a second pair of ears 127 which are welded to the ends of an associated pivot pin 128. Further, the member 94 includes a central web section 131 which is extended downwardly and forwardly to form a valve gate section 132, the lower edge of which cooperates with the adjacent portion of the seed tube 58, as will be explained in detail below.

The seed tube 58 is connected with the lower bell crank member 94 through the pivot pin 128 that is welded to the ears 127. A combined pivot bracket and lower seed ejecting member, indicated in its entirety by the reference numeral 135 and best shown in Figure 6, is fixed to the lower portion of the seed tube 58 and overlies the lower portions of the edge sections 70 and 71 of the blank. The member 135 includes an upper portion which is shaped so as to provide a generally hemi-cylindrical curved section 137 which is adapted to snugly receive the pivot pin 128. The curved section 137 is formed with a dirt discharge opening 138, and the lower end of the member 135 is curved, as indicated at 139, and in the completed seed tube, underlies the tabs 81 and cooperates with the extensions 77 to form the lower seed chamber 79. The curved section 139 of the member 135 also forms a toe or seed ejecting face 139a (Figure 1) and includes a forwardly extending lip 141 which is adapted to lie substantially flat against the lower edge of the valve gate extension 132 of the bell crank member 94. The member 135 is provided with a second opening 145 which is used as a gauge point in forming the curved portions 137 and 139.

The member 135 is fixed to the lower portion of the seed tube without the use of fixtures or the like. When making the seed tube, the assembler applies the member 94 over the lower end of the seed tube, placing the pivot pin 128 between the pairs of shoulders 74, 75. This locates the pin 128 relative to the seed tube. Next the assembler applies the member 135 to the seed tube, placing the curved section 137 about the pivot pin 128 after the lower curved portion 138 is disposed between the side wall extensions 77 and underneath the bent over tabs 81. In this way the member 135 is located relative to the seed tube through the pivot pin 128 and the shoulders 74, 75 so that the member 135 may be spot welded to the rear wall of the seed tube while the assembler is holding the member 135 engaged with the pin 128 and under the tabs 81. The side wall extensions 78 are provided so that the lower portion 132 of the lower valve member remains in position between the two side walls of the seed tube at all times. The central section 131 of the member 94 is provided with a recess 147 to receive the ball end of a pin 148 that is connected in any suitable way with a spring biased fertilizer valve pivotally supported in a fertilizer attachment 150. The present invention is not concerned with the details of the fertilizer valve unit.

By virtue of the above described features, the seed tube and associated parts are made as light in weight as possible, consistent with the required strength, whereby the inertia of the valve parts is materially reduced, as compared with prior valves, and hence the planting may be performed at a higher rate of speed than heretofore. Also, the fabrication of the seed tube and valve unit has been materially simplified and the number of necessary parts reduced.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. In a planter including an oscillatable seed tube and a supporting member pivotally connected therewith by means of a transverse pivot pin, a combined pin-receiving member and seed-ejecting toe section comprising an elongated part having a transverse generally hemi-cylindrical pivot pin embracing section adjacent one end and a curved seed-engaging section adjacent the other end.

2. In a planter including an oscillatable seed tube and a supporting member pivotally connected therewith by means of a transverse pivot pin, a combined pin-receiving member and seed-ejecting toe section comprising an elongated part having a pivot pin embracing section adjacent one end and a seed-engaging section adjacent the other end, said pivot pin embracing section having a dirt discharge opening.

3. In a planter including an oscillatable seed tube and a supporting member pivotally connected therewith by means of a transverse pivot pin, a combined pin-receiving member and seed-ejecting toe section comprising an elongated part having a pivot pin embracing section adjacent one end and a seed-engaging section adjacent the other end, and an extension formed on said supporting member and forming with said seed ejecting toe section a seed valve, the lower portion of said toe section being bent laterally outwardly for a relatively short distance and adapted to engage substantially flat against the lower edge portion of said extension.

4. In a planter including an oscillatable seed tube and a supporting member pivotally connected therewith by means of a transverse pivot pin, a combined pin-receiving member and seed-ejecting toe section comprising an elongated part having a transverse generally hemi-cylindrical pivot pin embracing section adjacent one end and a seed-engaging section adjacent the other end.

5. In a planter, an oscillatable seed-conducting means having a wall carrying a pair of spaced-apart pin-receiving shoulders, a member pivotally connected to said means including a pivot pin disposed between said shoulders, an elongated attaching part secured to said wall and having adjacent one end a curved portion embracing said pivot pin for pivotally connecting said member to said means, said part having at the other end a seed-engaging portion extending below said wall, and a pair of lugs on said means secured to said seed-engaging portion.

6. In a planter, an oscillatable seed-conducting means having a wall carrying a pair of spaced-apart pin-receiving shoulders, a member pivotally connected to said means including a pivot pin disposed between said shoulders, an elongated attaching part secured to said wall and having adjacent one end a curved portion embracing said pivot pin for pivotally connecting said member to said means, said part having at the other end a seed-engaging portion extending below said wall, and a pair of lugs on said means overlying and engaging said seed-engaging portion.

7. In a planter, an oscillatable seed-conducting means having a wall carrying pivot pin-receiving socket means, a member pivotally connected to said seed-conducting means including a pivot pin disposed in said socket means, an attaching part secured to said wall and having adjacent one section thereof a curved portion embracing said pivot pin for pivotally connecting said member to said seed-conducting means, said attaching part having at another section thereof a seed-engaging portion extending below said wall, and means connecting said attaching part to said seed-conducting means.

CHARLES H. WHITE.
WILLIAM P. OEHLER.

References Cited in the file of this patent

UNITED STATES PATENTS

| Number | Name | Date |
| --- | --- | --- |
| 357,047 | Skiles | Feb. 1, 1887 |
| 1,193,975 | Beardsley | Aug. 8, 1916 |
| 2,238,702 | McIntosh | Apr. 15, 1941 |
| 2,340,163 | White | Jan. 25, 1944 |
| 2,505,872 | White | May 2, 1950 |